United States Patent
Shoji

(10) Patent No.: US 7,045,790 B2
(45) Date of Patent: May 16, 2006

(54) IMAGING APPARATUS

(75) Inventor: Takashi Shoji, Kaisei-machi (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 364 days.

(21) Appl. No.: 10/349,103

(22) Filed: Jan. 23, 2003

(65) Prior Publication Data
US 2003/0136914 A1    Jul. 24, 2003

(30) Foreign Application Priority Data
Jan. 24, 2002   (JP)   ............... 2002-015655

(51) Int. Cl.
G01T 1/24    (2006.01)
(52) U.S. Cl. ............ 250/370.15; 250/370.09; 250/370.01
(58) Field of Classification Search .......... 250/370.08, 250/370.09, 370.01, 370.15, 370.12, 484.4, 250/580, 582, 584, 585, 591, 589, 590
See application file for complete search history.

(56) References Cited

U.S. PATENT DOCUMENTS

| 4,521,808 A | * | 6/1985 | Ong et al. ............... 378/29 |
| 4,727,252 A | * | 2/1988 | Yoshimura et al. ......... 250/588 |
| 4,908,514 A | * | 3/1990 | Bauer et al. ............... 250/589 |
| 5,002,178 A | | 3/1991 | Yamada |
| 5,103,092 A | | 4/1992 | Takahashi et al. |
| 5,432,354 A | * | 7/1995 | Ohara ..................... 250/582 |
| 5,644,142 A | * | 7/1997 | Namiki et al. ............. 250/586 |
| 6,140,663 A | * | 10/2000 | Neary et al. .............. 250/588 |
| 6,268,614 B1 | | 7/2001 | Imai |
| 6,469,312 B1 | * | 10/2002 | Agano .................... 250/580 |
| 6,495,836 B1 | * | 12/2002 | Hata .................... 250/370.09 |
| 2001/0025934 A1 | | 10/2001 | Agano |
| 2001/0038076 A1 | | 11/2001 | Kuwabara |

FOREIGN PATENT DOCUMENTS

JP    2000-153959    6/2000

* cited by examiner

Primary Examiner—Albert Gagliardi
(74) Attorney, Agent, or Firm—Sughrue Mion, PLLC

(57) ABSTRACT

A solid-state detector is accommodated within a case housing. The solid-state detector is provided with a layer containing amorphous selenium as a principal constituent and operates such that the solid-state detector records image information as an electrostatic latent image, and such that the solid-state detector generates electric currents in accordance with the electrostatic latent image when the solid-state detector is scanned with reading light. A heat discharging device discharges heat within the case housing to the exterior of the case housing, such that a temperature of the layer containing the amorphous selenium as the principal constituent is kept at a temperature lower than 40° C.

5 Claims, 8 Drawing Sheets

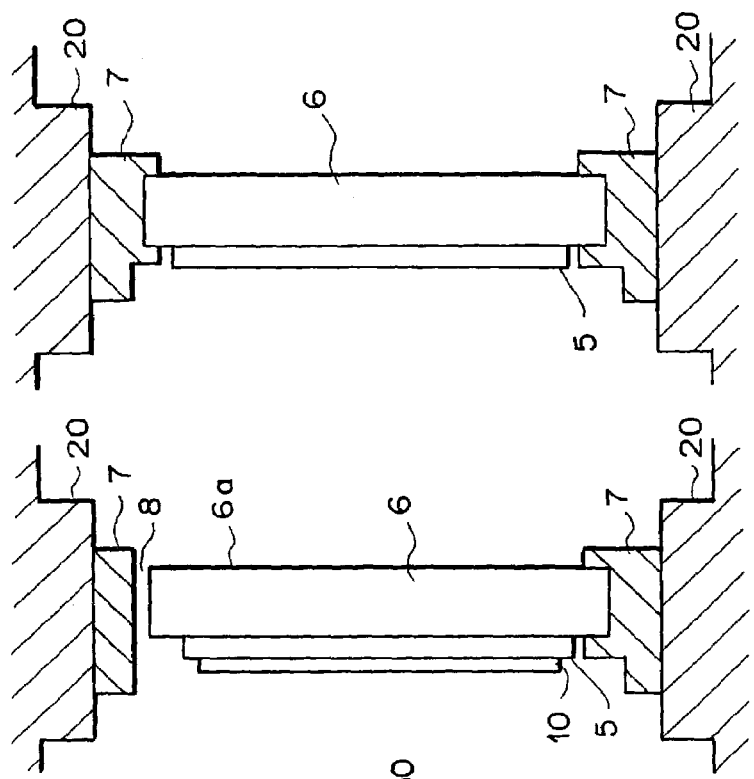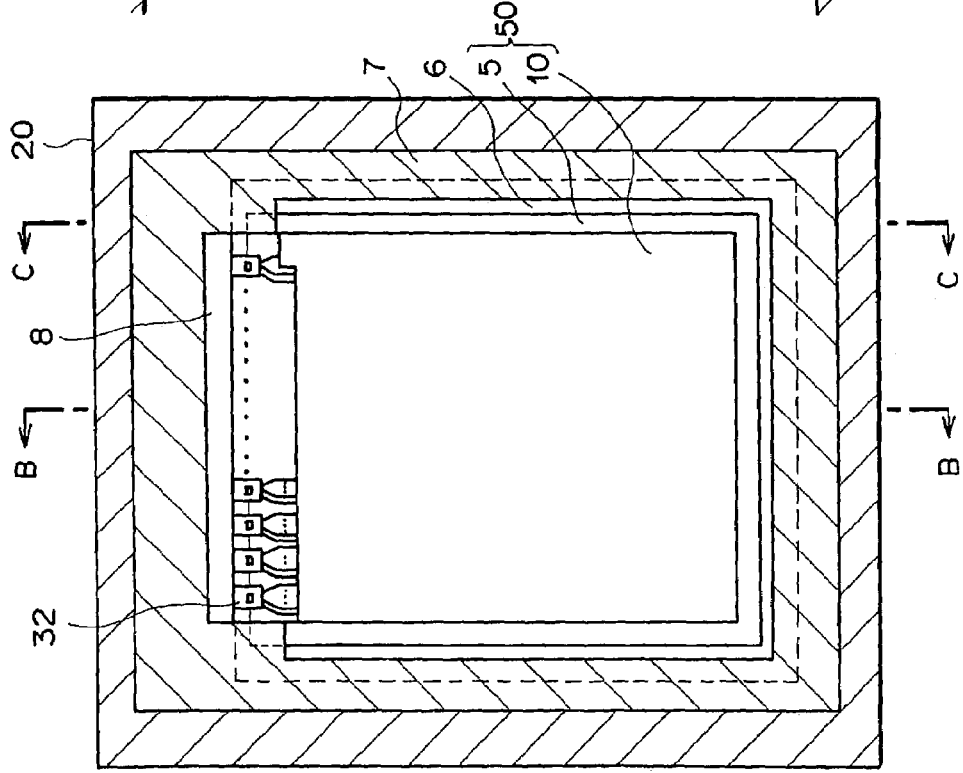

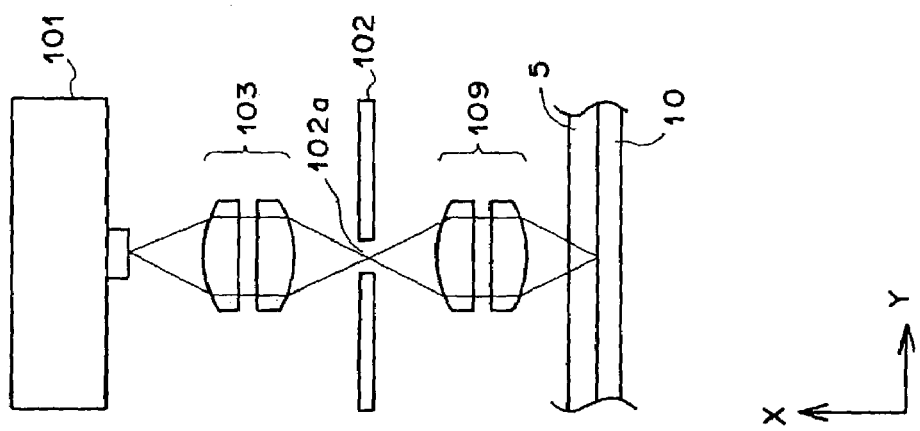
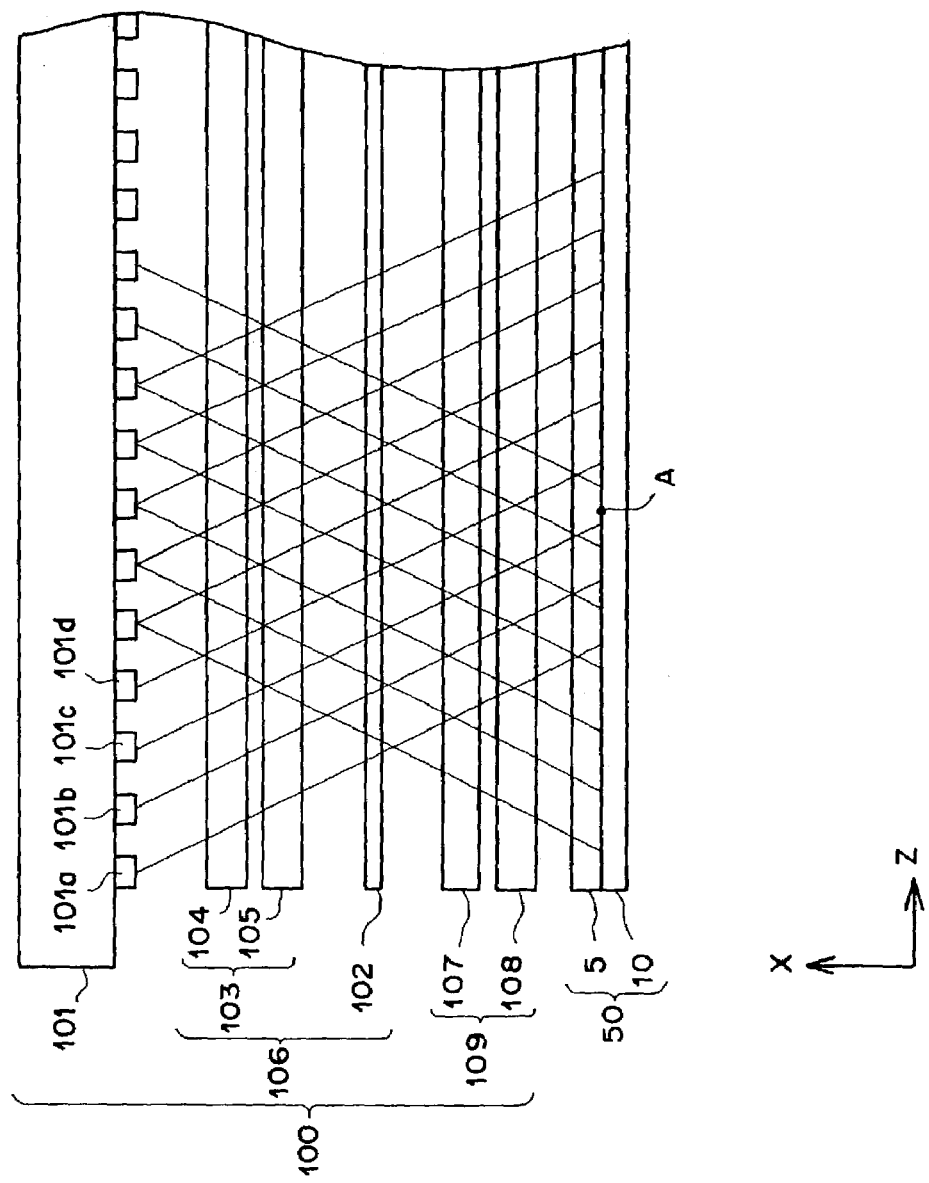

X-Z CROSS SECTION

X-Z CROSS SECTION

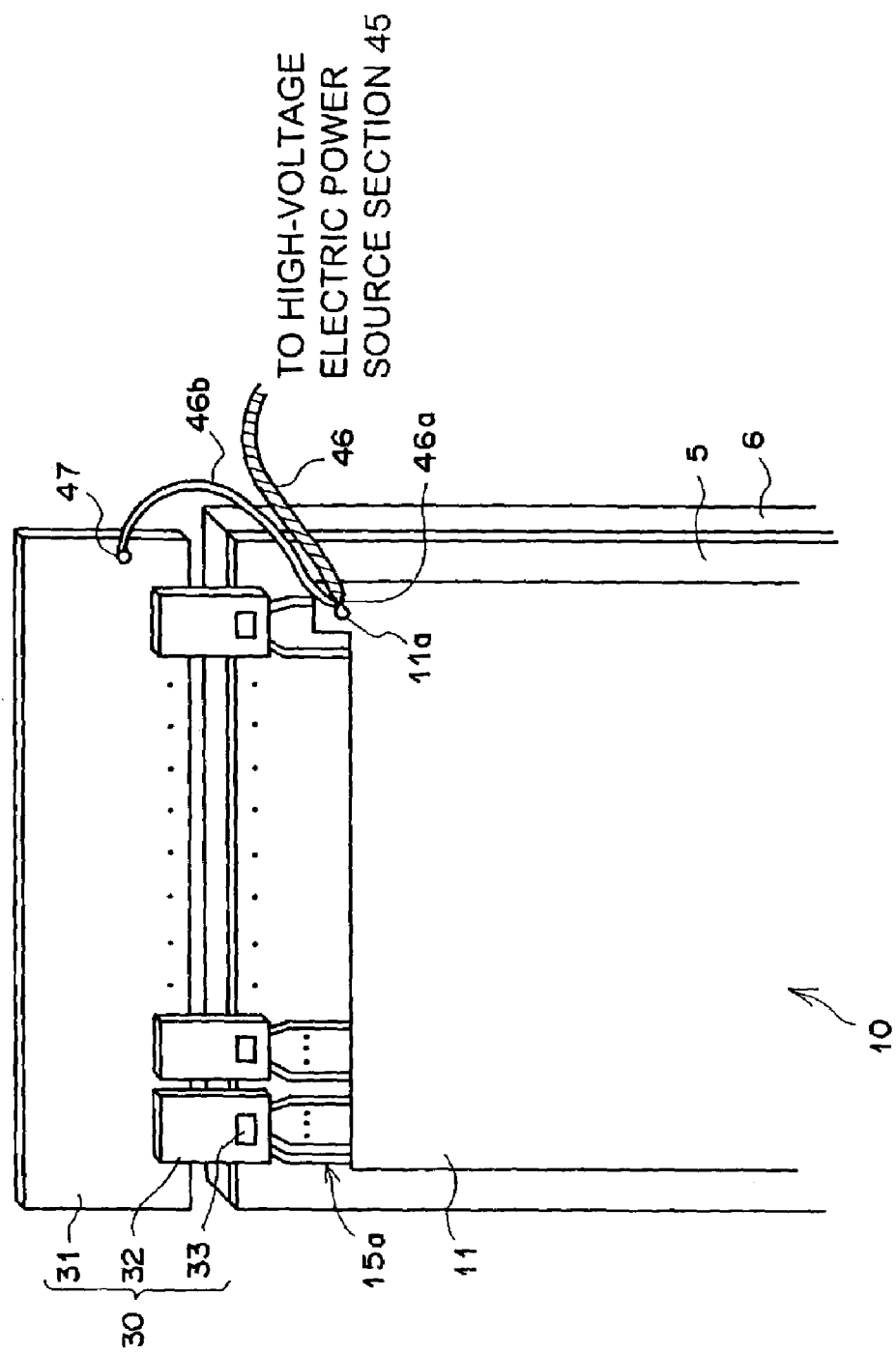

IMAGING APPARATUS

BACKGROUND OF THE INVENTION

1. Field of the Invention

This invention relates to an imaging apparatus. This invention particularly relates to an imaging apparatus, which comprises a solid-state detector provided with a layer containing amorphous selenium as a principal constituent.

2. Description of the Related Art

Systems for recording and reading out radiation image information by utilizing solid-state detectors have heretofore been proposed. With the proposed systems for recording and reading out radiation image information, such that a radiation dose delivered to an object during a medical X-ray image recording operation may be kept small, and such that the image quality of an image and its capability of serving as an effective tool in, particularly, the efficient and accurate diagnosis of an illness may be enhanced, a solid-state detector, which is provided with a photo-conductive material sensitive to radiation (such as X-rays), e.g. a selenium plate constituted of amorphous selenium (a-Se), or the like, is employed. The solid-state detector is exposed to radiation for recording (i.e., recording light), such as X-rays, carrying radiation image information, and electric charges carrying the radiation image information are accumulated as latent image charges in a charge accumulating section formed within the solid-state detector. Thereafter, the solid-state detector, on which the radiation image information has been recorded, is scanned with an electromagnetic wave for reading (i.e., reading light), such as a laser beam, and electric currents occurring within the solid-state detector are detected via flat plate-shaped electrodes or stripe-shaped electrodes located on opposite sides of the solid-state detector. In this manner, an electrostatic latent image, which is carried by the latent image charges, i.e. the radiation image information, is read out from the solid-state detector. The systems for recording and reading out radiation image information by utilizing solid-state detectors are described in, for example, U.S. Pat. No. 6,268,614 and U.S. patent application Ser. No. 09/539,412. Also, the applicant proposed a portable type of imaging apparatus, which comprises a compact case housing and a solid-state detector built in the case housing, in, for example, U.S. patent application Ser. No. 09/834,887.

However, the a-Se utilized in the solid-state detector described above has the properties such that the heat resistance is low, and the glass transition temperature (Tg) is as low as approximately 40° C. Therefore, in cases where the temperature within the case housing of the imaging apparatus. rises, and the region within the case housing of the imaging apparatus is kept at a temperature of at least 40° C. for a predetermined period of time, the characteristics of the a-Se change due to crystallization. As a result, there is the risk that an artifact will occur, or the signal-to-noise ratio will become low in a region of the a-Se, in which the characteristics have changed. Accordingly, in cases where the a-Se is employed in one of layers constituting the solid-state detector, which is built in the imaging apparatus, it is necessary that heat occurring within the case housing of the imaging apparatus is dissipated such that the temperature within the case housing does not become higher than the glass transition temperature described above.

Such that the aforesaid temperature rise within a detector may be eliminated, a detector provided with heat dissipation means has been proposed in, for example, Japanese Unexamined Patent Publication No. 2000-153959. In the proposed detector, in order for safety and reliability of the detector to be enhanced, the heat dissipation means is located at a holding section, which is secured to the detector.

In the detector proposed in Japanese Unexamined Patent Publication No. 2000-153959, Se is employed as an example at an X-ray-to-electric charge converting section. However, in Japanese Unexamined Patent Publication No. 2000-153959, nothing is mentioned with respect to the problems inherent to Se (or a-Se), and no specific technique for the elimination of the problems inherent to the a-Se is disclosed.

SUMMARY OF THE INVENTION

The primary object of the present invention is to provide an imaging apparatus, which comprises a solid-state detector provided with a layer containing a-Se as a principal constituent, wherein occurrence of an artifact and a lowering of a signal-to-noise ratio due to deterioration of characteristics of the a-Se are suppressed.

The present invention provides an imaging apparatus, comprising:

i) a case housing, and ii) a solid-state detector, which is accommodated within the case housing and is provided with a layer containing amorphous selenium as a principal constituent, the solid-state detector operating such that the solid-state detector records image information as an electrostatic latent image, and such that the solid-state detector generates electric currents in accordance with the electrostatic latent image when the solid-state detector is scanned with reading light, wherein the improvement comprises the provision of heat discharging means for discharging heat within the case housing to the exterior of the case housing, such that a temperature of the layer containing the amorphous selenium as the principal constituent is kept at a temperature lower than 40° C.

The term "solid-state detector" as used herein means the detector, which is capable of recording image information as an electrostatic latent image when being exposed to recording light (not limited to visible light, and including radiation) carrying the image information. By way of example, the solid-state detector maybe an electrostatic recording material, which is capable of recording image information as an electrostatic latent image and generating electric currents in accordance with the electrostatic latent image when being scanned with a reading electromagnetic wave, and which is described in, for example, Japanese Unexamined Patent Publication No. 2000-105297.

The imaging apparatus in accordance with the present invention maybe modified such that the imaging apparatus further comprises reading light irradiating means, which is accommodated within the case housing, and which irradiates the reading light to the solid-state detector, and the reading light irradiating means is provided with heat dissipation means for the reading light irradiating means.

Also, the imaging apparatus in accordance with the present invention maybe modified such that the imaging apparatus further comprises an electronic circuit board having predetermined functions, which electronic circuit board is accommodated within the case housing, and the electronic circuit board is provided with heat dissipation means for the electronic circuit board.

Further, the imaging apparatus in accordance with the present invention may be modified such that the heat discharging means comprises a fan.

If the fan is rotated at the time of detection of the electric currents, there will be the risk that vibration of the electronic circuit board, or the like, and a change in magnetic field will occur due to air flow, and a noise will thus occur in a detection signal. Therefore, the fan should preferably be ceased at least at the time of detection of the electric currents.

The imaging apparatus in accordance with the present invention comprises the case housing and the solid-state detector, which is accommodated within the case housing and is provided with the layer containing amorphous selenium (a-Se) as the principal constituent. The solid-state detector operates such that the solid-state detector records the image information as the electrostatic latent image, and such that the solid-state detector generates the electric currents in accordance with the electrostatic latent image when the solid-state detector is scanned with the reading light. The imaging apparatus is also provided with the heat discharging means for discharging heat within the case housing to the exterior of the case housing, such that the temperature of the layer containing the a-Se as the principal constituent is kept at a temperature lower than 40° C, which is the glass transition temperature of the a-Se. Therefore, with the imaging apparatus in accordance with the present invention, the problems are capable of being prevented from occurring in that an artifact occurs, or a signal-to-noise ratio becomes low due to a change of characteristics of the a-Se.

BRIEF DESCRIPTION OF THE DRAWINGS

FIG. 3A is a front view showing the solid-state. detector, a base plate, and a case housing, which front view is taken from the side of an electrostatic recording section, FIG. 3B is a sectional view taken on line B—B of FIG. 3A, FIG. 3C is a sectional view taken on line C—C of FIG. 3A, FIG. 4A is a side view showing an example of the reading exposure light source section of FIG. 2, which side view is taken from a Y direction, FIG. 4B is an X-Y sectional view showing the example of the reading exposure light source section of FIG. 4A, FIG. 6 is a perspective view showing how the solid-state detector, current detecting means, and a high-voltage electric power source section are connected to one another.

DESCRIPTION OF THE PREFERRED EMBODIMENTS

The present invention will hereinbelow be described in further detail with reference to the accompanying drawings.

Figure 1:
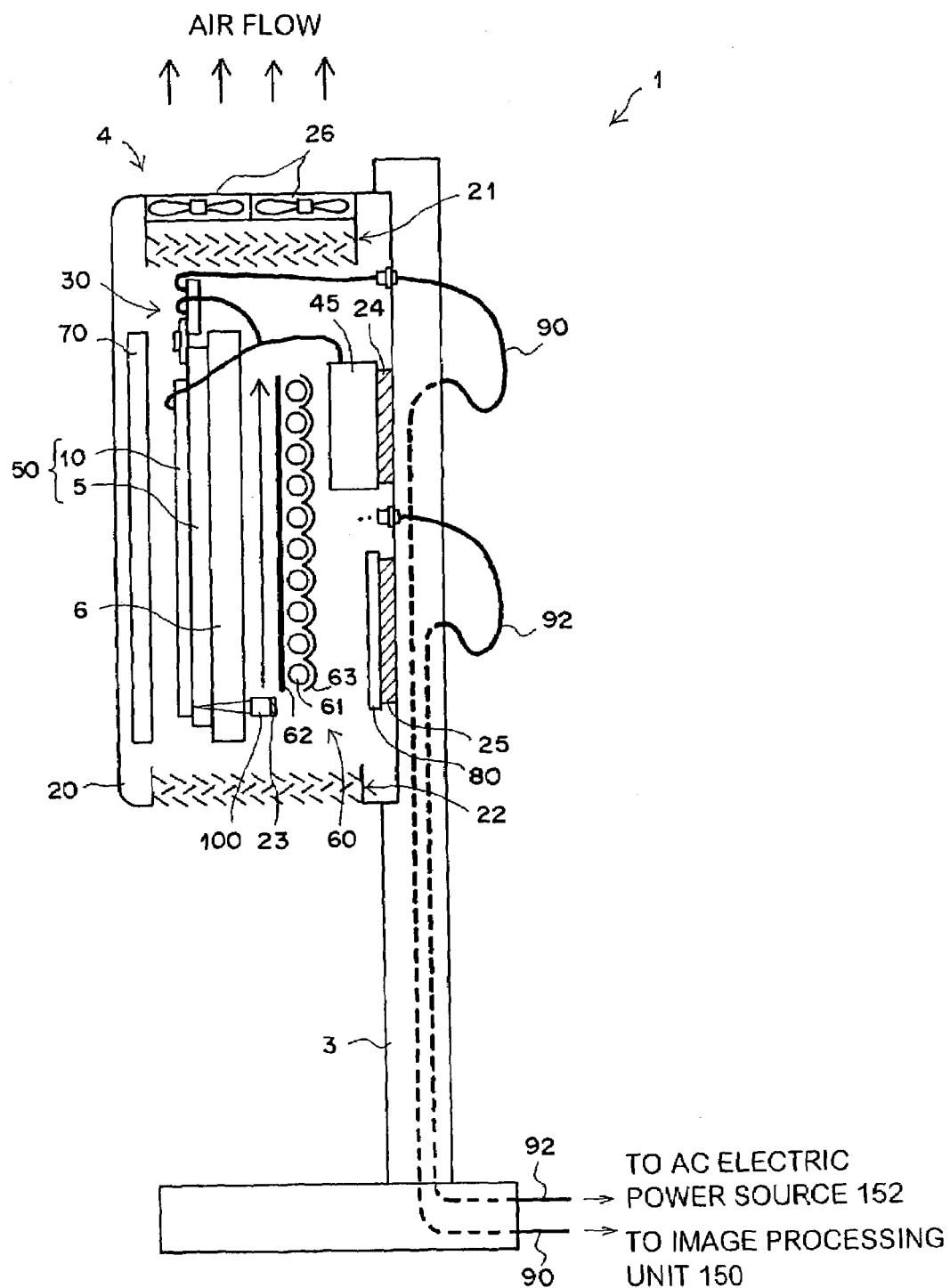
FIG. 1 is a sectional side view showing an embodiment of the imaging apparatus in accordance with the present invention, which is constituted as a chest image recording and read-out apparatus.

FIG. 1 is a sectional side view showing an embodiment of the imaging apparatus in accordance with the present invention, which is constituted as a chest image recording and read-out apparatus 1. As illustrated in FIG. 1, the chest image recording and read-out apparatus 1 comprises an imaging section 4, which is supported for vertical movement by a support post for image recording 3 via an actuator (not shown), such as a ball screw or a cylinder.

The imaging section 4 comprises a solid-state detector 50. The solid-state detector 50 comprises a glass substrate 5 and an electrostatic recording section 10, which acts as an imaging device and is formed on the glass substrate 5. The imaging section 4 also comprises a base plate 6 for supporting the glass substrate 5 of the solid-state detector 50. The imaging section 4 further comprises a reading exposure light source section (reading light irradiating means) 100, which is operated when radiation image information having been recorded on the electrostatic recording section 10 is to be read out from the electrostatic recording section 10. The imaging section 4 still further comprises current detecting means 30 for obtaining an image signal by detecting electric currents, which flow out from the electrostatic recording section 10 when the electrostatic recording section 10 is scanned with light having been radiated out from the reading exposure light source section 100. The imaging section 4 also comprises a high-voltage electric power source section 45 for applying a predetermined voltage across the electrostatic recording section 10. The imaging section 4 further comprises a pre-exposure light source section 60 for irradiating pre-exposure light to the electrostatic recording section 10 before an image recording operation is begun. The imaging section 4 still further comprises a grid 70 for absorbing scattered rays, which have been scattered by an object (not shown) when radiation passes through the object. The grid 70 is located on one side of the electrostatic recording section 10, which one side stands facing the object. The imaging section 4 also comprises a controlling printed-circuit board 80, which constitutes control means for controlling the reading exposure light source section 100, the pre-exposure light source section 60, and the grid 70. The above-enumerated elements constituting the imaging section 4 are accommodated within a case housing 20.

Also, the imaging section 4 is provided with a signal cable 90 for transmitting the image signal, which has been obtained from the current detecting means 30, through the support post for image recording 3 to an exterior image processing unit 150. The imaging section 4 is further provided with a power cable 92, which extends through the support post for image recording 3 and is connected to an exterior alternating current (a.c.) electric power source 152.

As described above, the elements for performing the image recording operation and an image read-out operation are accommodated within the single case housing 20. Therefore, the size of the imaging section 4 is capable of being kept small, and the imaging section 4 is capable of being moved easily. The features of the imaging section 4 are advantageous in practice.

The case housing 20 is provided with heat discharging means for discharging heat within the case housing 20 to the exterior of the case housing 20. The heat discharging means comprises fans 26, 26 and a light blocking louver 21, which are located at an upper region of the case housing 20. The heat discharging means also comprises a light blocking louver 22, which is located at a lower region of the case housing 20. The light blocking louver 21 and the light blocking louver 22 block external light and allow air to move therethrough. The fans 26, 26 cause air to flow upwardly. With the structure described above, air is capable of being moved upwardly within the case housing 20, and heat occurring within the case housing 20 is capable of being efficiently discharged from the case housing 20. Accordingly, in cases where the chest image recording and read-out apparatus 1 is used within an ordinary room, the temperature within the case housing 20 is capable of being kept at a temperature lower than 40° C., which is the glass transition temperature of the a-Se. As a result, the a-Se employed in the solid-state detector 50 is capable of being prevented from changing in characteristics, and the occurrence of an artifact and a lowering of the signal-to-noise ratio are capable of being prevented from occurring due to a change of the characteristics of the a-Se.

The high-voltage electric power source section 45 is secured to a wall of the case housing 20 via a heat transfer sheet 24. The heat transfer sheet 24 transfers heat, which is generated by the high-voltage electric power source section 45, to the wall of the case housing 20 and thus suppresses a temperature rise of the high-voltage electric power source section 45. In this manner, the temperature of the region in the vicinity of the solid-state detector 50 is capable of being lowered. Therefore, the a-Se employed in the solid-state detector 50 is capable of being more efficiently prevented from changing in characteristics.

Also, the controlling printed-circuit board 80 is secured to the wall of the case housing 20 via a heat transfer sheet 25. The heat transfer sheet 25 constitutes heat dissipation means for the controlling printed-circuit board (i.e., the heat dissipation means for the electronic circuit board). The heat transfer sheet 25 transfers heat, which is generated by the controlling printed-circuit board 80, to the wall of the case housing 20 and thus suppresses a temperature rise of the controlling printed-circuit board 80. In this manner, the temperature of the region in the vicinity of the solid-state detector 50 is capable of being lowered. Therefore, the a-Se employed in the solid-state detector 50 is capable of being more efficiently prevented from being crystallized.

Figure 2:
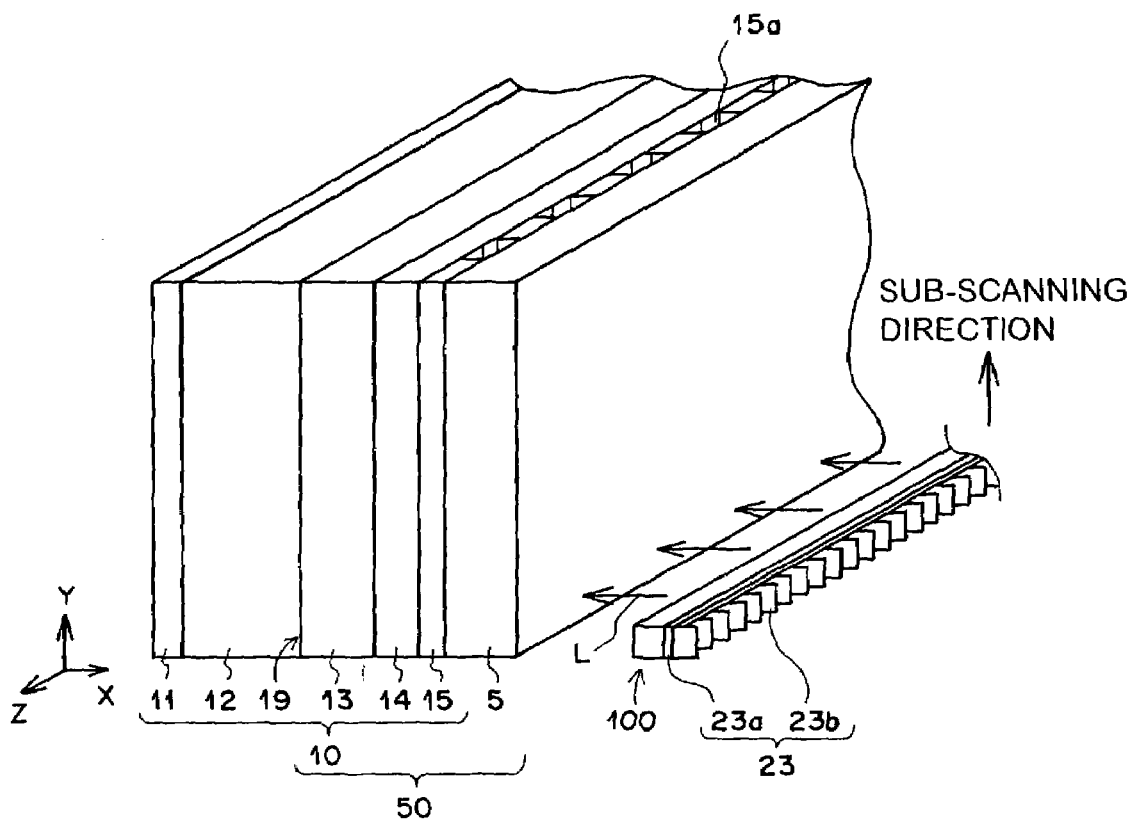
FIG. 2 is a perspective view showing an example of a solid-state detector and a reading exposure light source section, which are utilized in the chest image recording and read-out apparatus of FIG. 1.

FIG. 2 is a perspective view showing an example of the solid-state detector 50 and the reading exposure light source section 100. In FIG. 2, as an aid in facilitating the explanation, the base plate 6 is not shown.

The solid-state detector 50 comprises the glass substrate 5 and the electrostatic recording section 10, which is formed on the glass substrate 5. The electrostatic recording section 10 records the radiation image information as an electrostatic latent image. Also, when the electrostatic recording section 10, on which the radiation image information has been recorded as the electrostatic latent image, is scanned with a reading electromagnetic wave (hereinbelow referred to as reading light), the electrostatic recording section 10 generates electric currents in accordance with the electrostatic latent image. Specifically, as illustrated in FIG. 2, the electrostatic recording section 10 comprises a first electrically conductive layer 11, which has transmissivity to a recording electromagnetic wave (hereinbelow referred to as recording light), such as the X-rays carrying the image information of the object. The electrostatic recording section 10 also comprises a recording photo-conductive layer 12, which generates electric charges and exhibits photo-conductivity when the recording photo-conductive layer 12 is exposed to the recording light. The electrostatic recording section 10 further comprises a charge transporting layer 13, which acts approximately as an insulator with respect to latent image polarity charges (e.g., negative charges) occurring in the first electrically conductive layer 11, and which acts approximately as a conductor with respect to transported polarity charges (positive charges in this example) having a polarity opposite to the polarity of the latent image polarity charges occurring in the first electrically conductive layer 11. The electrostatic recording section 10 still further comprises a reading photo-conductive layer 14, which generates electric charges and exhibits photo-conductivity when it is exposed to the reading light, and a second electrically conductive layer 15 having transmissivity to the reading light. The first electrically conductive layer 11, the recording photo-conductive layer 12, the charge transporting layer 13, the reading photo-conductive layer 14, and the second electrically conductive layer 15 are overlaid in this order. A charge accumulating section 19 is formed at an interface between the recording photo-conductive layer 12 and the charge transporting layer 13.

Each of the first electrically conductive layer 11 and the second electrically conductive layer 15 constitutes an electrode. The electrode of the first electrically conductive layer 11 is formed as a flat plate-shaped electrode, which is flat in two-dimensional directions. As indicated by the hatching in FIG. 2, the electrode of the second electrically conductive layer 15 is formed as a striped electrode comprising a plurality of elements (linear electrodes) 15a, 15a, . . . , which are arrayed in a striped pattern at a pixel pitch. (As for the striped electrode, reference may be made to an electrostatic recording material described in Japanese Unexamined Patent Publication No. 2000-105297.) The array direction of the elements 15a, 15a, . . . , along which the elements 15a, 15a, . . . stand side by side, corresponds to the main scanning direction. The longitudinal direction of each element 15a corresponds to the sub-scanning direction.

The reading photo-conductive layer 14 should preferably be constituted of a photo-conductive material having a high sensitivity with respect to an electromagnetic wave having wavelengths (300 nm to 550 nm) of the near ultraviolet to blue region and having a low sensitivity with respect to an electromagnetic wave having wavelengths (at least 700 nm) of the red region. Specifically, the reading photo-conductive layer 14 should preferably be constituted of a photo-conductive material containing the a-Se as the principal constituent.

In this embodiment, the width of each element 15a is 50 µm. Also, the elements 15a, 15a, . . . are arrayed at a pixel pitch of 100 µm. The elements 15a, 15a, . . . are constituted of a material having transmissivity to light having wavelengths of at most 550 nm, e.g., indium tin oxide (ITO) or thin film Al. Further, the a-Se is employed in the reading photo-conductive layer 14.

FIG. 3A is a front view showing the solid-state detector 50 in the imaging section 4, the base plate 6, and the case housing 20, which front view is taken from the side of the electrostatic recording section 10. FIG. 3B is a sectional view taken on line B—B of FIG. 3A. FIG. 3C is a sectional view taken on line C—C of FIG. 3A. As illustrated in FIGS. 3A, 3B, and 3C, the base plate 6 supports the glass substrate 5 of the solid-state detector 50. Ordinarily, the glass substrate 5 has a thickness of at most 1.1 mm and is thus markedly thin. The base plate 6 is constituted of a sufficiently thick glass plate, such that the base plate 6 does not bend when the base plate 6 is located vertically as illustrated in FIGS. 3A, 3B, and 3C. In this embodiment, the base plate 6 has a thickness of at least 5 mm. The base plate 6 has transmissivity with respect light radiated out from a reading exposure light source and light radiated out from a pre-exposure light source. Also, the base plate 6 has a refractive index and a coefficient of thermal expansion, which are approximately identical with the refractive index and the coefficient of thermal expansion of the glass substrate 5. Further, in order for light loss and stray light due to reflection of the reading light to be prevented from occurring, an anti-reflection (AR) coating film is formed on a reading light entry face 6a of the base plate 6. The base plate 6 and the glass substrate 5 are adhered to each other with an adhesive agent, such as an epoxy resin or Canada balsam. As illustrated in FIGS. 3A, 3B, and 3C, four corner regions, right and left side regions, and a bottom region of the base plate 6 are fitted into a fitting member 7 constituted of a metal, or the like, and the base plate 6 is thus reinforced and secured to the case housing 20. A space 8, through which a tape automated bonding (TAB) film 32 for connecting the electrostatic recording section 10 and a printed-circuit board 31 to each other as will be described later passes, is formed between the top region of the base plate 6 and the fitting member 7. Specifically, as illustrated in FIG. 3B, the space 8 is formed between the top region of the base plate 6, which top region extends above the electrostatic recording section 10, and the fitting member 7. Also, as illustrated in FIG. 3C, the upper right corner region of the base plate 6 shown in FIG. 3A is fitted into the fitting member 7.

The reading exposure light source section 100 comprises a light source, which is constituted of a plurality of LED chips arrayed in a line, and an optical system for linearly irradiating the light, which has been radiated out from the light source, to the electrostatic recording section 10. The reading exposure light source section 100 is kept at a predetermined distance from the electrostatic recording section 10 and is moved by a linear motor (not shown) in the longitudinal direction of each element 15a of the second electrically conductive layer 15 of the electrostatic recording section 10. In this manner, the entire area of the electrostatic recording section 10 is exposed to the light having been radiated out from the light source.

As described above, the reading photo-conductive layer 14 is constituted of the photo-conductive material having a high sensitivity with respect to the electromagnetic wave having wavelengths (300 nm to 550 nm) of the near ultraviolet to blue region and having a low sensitivity with respect to the electromagnetic wave having wavelengths (at least 700 nm) of the red region. Therefore, as the light source of the reading exposure light source section 100, a light source, which produces light having wavelengths (at most 550 nm) of the near ultraviolet to blue region, is employed.

An example of the reading exposure light source section 100 will be described hereinbelow with reference to FIGS. 4A and 4B. FIG. 4A is a side view showing the example of the reading exposure light source section 100 of FIG. 2, which side view is taken from a Y direction. FIG. 4B is an X-Y sectional view showing the example of the reading exposure light source section 100 of FIG. 4A. In FIGS. 4A and 4B, as an aid in facilitating the explanation, the base plate 6 is not shown.

As illustrated in FIGS. 4A and 4B, the reading exposure light source section 100 comprises a light source 101, which comprises a plurality of LED chips 101a, 101b, . . . arrayed linearly in a Z axis direction. The reading exposure light source section 100 also comprises first optical means 106 for enhancing the quality of the light having been radiated out from the light source 101. The first optical means 106 is provided with a slit member 102, which has an opening area 102a extending in the longitudinal direction of the light source 101, and cylindrical lenses 104 and 105, which constitute an optical member 103 for converging the light toward the opening area 102a of the slit member 102. The reading exposure light source section 100 further comprises second optical means 109. The second optical means 109 is provided with cylindrical lenses 107 and 108 for converging the light, which has passed through the first optical means 106, onto the surface of the electrostatic recording section 10 and with respect to the direction normal to the longitudinal direction of the light source 101.

The slit member 102 performs spatial filtering of the light, which has been radiated out from the light source 101, in order to restrict flare light and determines the beam width on the electrostatic recording section 10. It is sufficient for the slit member to restrict the spatial spread of the light. The slit member is not limited to the mechanical slit member 102 having the opening area 102a and may be a slit member having an optical space, such as a distributed density filter.

Each of light beams, which have been radiated out from the light emission points, i.e. the LED chips 101a, 101b, of the light source 101, is converged by the cylindrical lenses 104 and 105 toward the opening area 102a of the slit member 102 and into a light beam extending along the longitudinal direction of the opening area 102a and is thus subjected to filtering. Each of the light beams is then converged by the cylindrical lenses 107 and 108 of the second optical means 109 and with respect to the direction normal to the longitudinal direction of the light source 101. Each of the thus converged light beams is irradiated onto the electrostatic recording section 10. Each of the light beams, which have been radiated out from the LED chips 101a, 101b, . . . , spreads and diffuses uniformly in all directions and is not converged with respect to the longitudinal direction of the light source 101. Therefore, on the electrostatic recording section 10, each of the light beams, which have been radiated out from the LED chips 101a, 101b, . . . , spreads in the longitudinal direction of the light source 101. As a result, the light having been radiated out from the light source 101 is linearly irradiated to the electrostatic recording section 10, and a plurality of pixels arrayed linearly on the electrostatic recording section 10 are simultaneously exposed to each of the light beams having been radiated out from the LED chips 101a, 101b, . . . Specifically, the light beams, which have been radiated out from several LED chips among the LED chips 101a, 101b, . . . , are simultaneously irradiated to an identical pixel on the electrostatic recording section 10. For example, as illustrated in FIG. 4A, the light beams, which have been radiated out from seven LED chips among the LED chips 101a, 101b, . . . , are simultaneously irradiated to an identical point A on the electrostatic recording section 10.

More specifically, for example, the focal length of the optical system may be 40 mm, and the pixel size may be 100 µm. Also, the intervals between the LED chips (i.e., the intervals between the light emission points) may be 200 µm, and the beam spread angle, which is taken from each LED chip and in the longitudinal direction of the light source, may be 120° half value). In such cases, the light beams, which have been radiated out from at least 700 LED chips, are simultaneously irradiated to an identical pixel on the electrostatic recording section 10.

At the reading exposure light source section 100 described above, in lieu of the cylindrical lenses 104 and 105 of the first optical means 106, a SELFOC lens may be employed.

Also, the light source 101 of the reading exposure light source section 100 described above comprises the plurality of the arrayed LED chips 101a, 101b, . . . Alternatively, in lieu of the LED chips 101a, 101b, . . . , a plurality of LD chips may be arrayed. As another alternative, an LED array or an LD array comprising a plurality of light emission points arrayed linearly may be employed as the light source.

Further, in this embodiment, the reading exposure light source section 100 is provided with heat dissipation means 23 for the reading exposure light source section (i.e., the heat dissipation means for the reading light irradiating means) The heat dissipation means 23 for the reading exposure light source section comprises a Peltier device 23a, which is located on a surface of the reading exposure light source section 100 opposite to the surface that stands facing the solid-state detector 50, and a heat sink 23b, which is located on a heat emission side of the Peltier device 23a. The Peltier device 23a transfers heat, which is generated by the reading exposure light source section 100, to the side opposite to the solid-state detector 50. The heat sink 23b dissipates heat, which has been transferred by the Peltier device 23a, to the region within the case housing 20. In this manner, the temperature of the area in the vicinity of the solid-state detector 50 is capable of being lowered. Therefore, the a-Se employed in the solid-state detector 50 is capable of being more efficiently prevented from changing in characteristics.

In the embodiment described above, the reading exposure light source section 100 is provided with the light source 101 having the plurality of the light emission points arrayed linearly. However, the reading exposure light source section in the imaging apparatus in accordance with the present invention is not limited to the reading exposure light source section 100 described above. For example, a reading exposure light source section comprising a surface-shaped light source, which is provided with small light sources arrayed in a surface-like form, and light source control means for controlling the surface-shaped light source may be employed in lieu of the reading exposure light source section 100. The reading exposure light source section constituted in this manner is described in, for example, Japanese Unexamined Patent Publication No. 2000-162726.

Figure 5A:
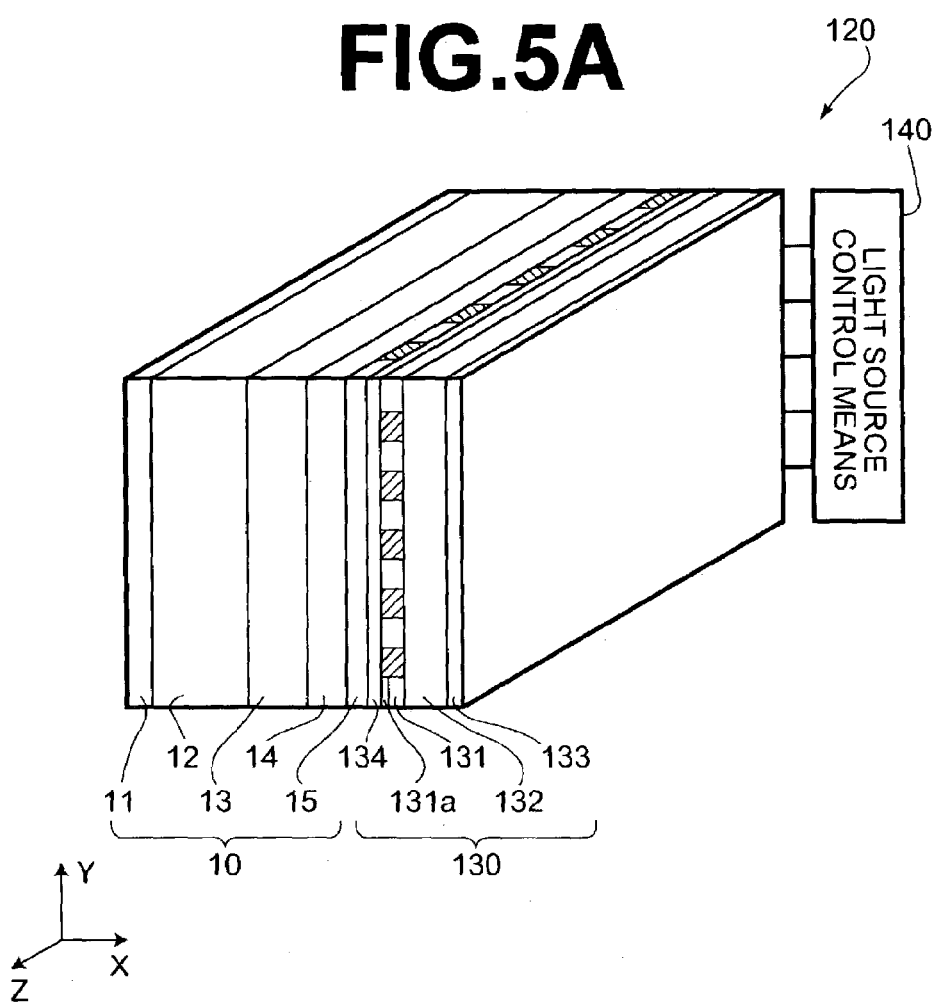
FIG. 5A is a perspective view showing an electrostatic recording section and a different example of a reading exposure light source section.
Figure 5B:
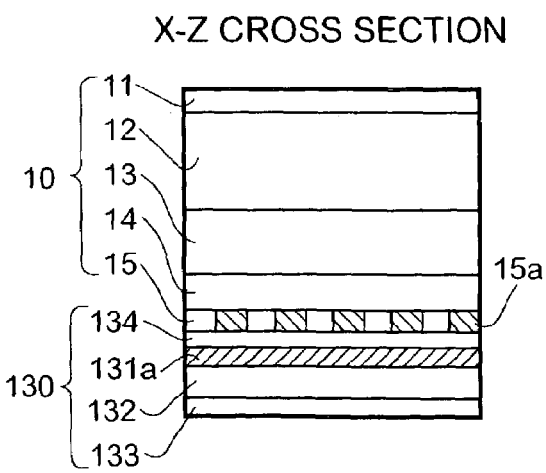
FIG. 5B is an X-Z sectional view showing the electrostatic recording section and the different example of the reading exposure light source section of FIG. 5A.
Figure 5C:
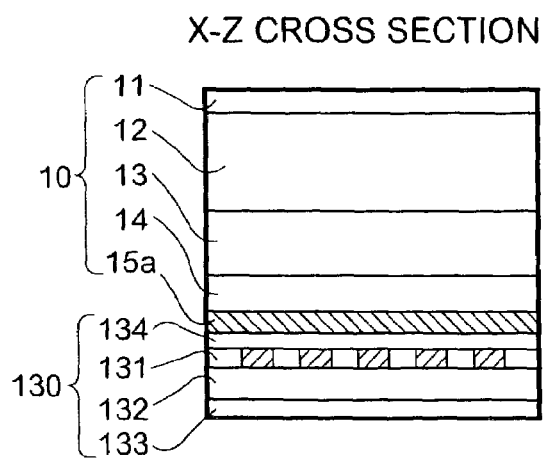
FIG. 5C is an X-Y sectional view showing the electrostatic recording section and the different example of the reading exposure light source section of FIG. 5A.

FIG. 5A is a perspective view showing the electrostatic recording section 10 and a different example of a reading exposure light source section 120. FIG. 5B is an X-Z sectional view showing the electrostatic recording section 10 and the different example of the reading exposure light source section 120 of FIG. 5A. FIG. 5C is an X-Y sectional view showing the electrostatic recording section 10 and the different example of the reading exposure light source section 120 of FIG. 5A. In FIGS. 5A, 5B, and 5C, as an aid in facilitating the explanation, the glass substrate 5 is not shown. As illustrated in FIGS. 5A, 5B, and 5C, the different example of the reading exposure light source section 120 comprises a surface-shaped light source 130 and light source control means 140 for controlling the surface-shaped light source 130. The surface-shaped light source 130 is located between the second electrically conductive layer 15 of the electrostatic recording section 10 and the glass substrate 5 and is combined with the electrostatic recording section 10 into an integral body.

Specifically, the surface-shaped light source 130 is constituted of an electroluminescence (EL) device. The surface-shaped light source 130 comprises an electrically conductive layer 131, an EL layer 132, and an electrically conductive layer 133. An insulation layer 134 is formed between the second electrically conductive layer 15 of the electrostatic recording section 10 and the electrically conductive layer 131 of the surface-shaped light source 130. The electrically conductive layer 131 is formed as a striped electrode, which comprises a plurality of elements (linear electrodes) 131a, 131a, . . . arrayed at the pixel pitch and in a stripe-like form so as to intersect (in this embodiment, approximately perpendicularly) with the elements 15a, 15a, . . . of the electrostatic recording section 10. In this manner, the surface-shaped light source 130 is constituted such that the plurality of the elements 131a, 131a, . . . (hatched in FIG. 5A), which act as line-shaped light sources, are arrayed in a surface form. Each of the elements 131a, 131a, . . . is connected to the light source control means 140. Also,each of the elements 131a, 131a, . . . is formed from a material transparent with respect to EL light produced by the EL layer 132. The electrically conductive layer 133 is formed as a flat plate-shaped electrode. The electrically conductive layer 133 is formed from a material, which totally reflects the EL light produced by the EL layer 132.

The light source control means 140 applies a predetermined voltage across the elements 131a, 131a, . . . and the electrically conductive layer 133, which stands facing the elements 131a, 131a, . . . The voltage is applied successively to the elements 131a, 131a, . . . Alternatively, the voltage may be applied simultaneously to several elements 131a, 131a, or all of them. The elements 131a, 131a, . . . are successively changed over, and a predetermined d.c. voltage is applied across each element 131a and the electrically conductive layer 133. By the application of the d.c. voltage, the EL light is produced by the EL layer 132, which is sandwiched between the element 131a and the electrically conductive layer 133. Since the element 131a has the line-like shape, the EL light having passed through the element 131a is capable of being utilized as the line-like reading light. Specifically, the surface-shaped light source 130 is equivalent to a light source comprising a plurality of line-shaped small light sources, which are arrayed in a surface form. In cases where the EL light is produced by successively changing over the elements 131a, 131a, . . . , the electrostatic recording section 10 is electrically scanned with the reading light.

In cases where the surface-shaped light source 130, which has been combined with the electrostatic recording section 10 into an integral body, is utilized as the reading exposure light source, a space for the movement of the light source and a linear motor, or the like, for moving the light source need not be utilized. Therefore, the size of the entire imaging apparatus is capable of being kept small.

Also, the reading exposure light source section 120, which comprises the surface-shaped light source 130 and the light source control means 140, is capable of being utilized also as a pre-exposure light source section. Specifically, a predetermined voltage is applied simultaneously across a plurality of the elements 131a, 131a, . . . and the electrically conductive layer 133. In such cases, it is sufficient for the pre-exposure light, which is produced by the EL layer 132 with the application of the voltage, to be approximately uniformly irradiated to the electrostatic recording section 10, and no limitation is imposed upon the number of the elements 131a, 131a, . . . , to which the voltage is applied. For example, the voltage may be applied only to several elements, which are selected at predetermined intervals from the plurality of the elements 131a, 131a, . . . Alternatively, the voltage may be applied to all of the elements 131a, 131a, In cases where the reading light and the pre-exposure light are produced by the single same light source, since a particular pre-exposure light source need not be utilized, the size of the imaging apparatus is capable of being reduced even further. Also, since the number of parts of the imaging apparatus is capable of being kept small, the cost of the imaging apparatus is capable of being kept low.

In cases where the surface-shaped light source 130, which has been combined with the electrostatic recording section 10 into an integral body, is utilized as the reading exposure light source and the pre-exposure light source, the side of the surface-shaped light source 130 in the combination of the electrostatic recording section 10 and the surface-shaped light source 130 may be supported on the base plate. In such cases, the base plate need not have transmissivity to light.

Also, in cases where heat generated by the surface-shaped light source 130 is to be dissipated, a Peltier device and a heat sink may be located on a surface of the base plate, which surface is opposite to the surface that stands facing the solid-state detector 50.

As illustrated in FIG. 6, the current detecting means 30 comprises the printed-circuit board 31 and the tape automated bonding (TAB) film 32, which is comparatively short and has one end connected to the printed-circuit board 31. The current detecting means 30 also comprises a charge amplifying IC 33, which is located on the TAB film 32. The other end of the TAB film 32 is connected to the electrostatic recording section 10.

FIG. 6 is a perspective view showing how the electrostatic recording section 10, the current detecting means 30, and the high-voltage electric power source section 45 are connected to one another. As illustrated in FIG. 6, each of the elements 15a, 15a, . . . of the electrostatic recording section 10 is connected to the charge amplifying IC 33 via a printed-circuit pattern (not shown), which is formed on the TAB film 32. Also, the charge amplifying IC 33 is connected to the printed-circuit board 31 via a printed-circuit pattern (not shown), which is formed on the TAB film 32. In this embodiment, instead of all elements 15a, 15a, . . . being connected to a single charge amplifying IC 33, several charge amplifying IC's 33, 33, . . . to several tens of charge amplifying IC's 33, 33, . . . are utilized as a whole, and several adjacent elements 15a, 15a, . . . are connected to one of the charge amplifying IC's 33, 33, . . .

The first electrically conductive layer 11, which is constituted as the flat plate-shaped electrode of the electrostatic recording section 10, is provided with a non-imaging region 11a, which extends from the image recording region. A hot side (a core wire) 46a of a cable 46, which extends from the high-voltage electric power source section 45 located in the vicinity of the electrostatic recording section 10, is directly bonded to the non-imaging region 11a. A grounding side (a cladding layer) 46b of the cable 46 is connected by a screw 47 to the printed-circuit board 31. In this embodiment, the hot side 46a is set at a minus potential with respect to the grounding side 46b. The grounding side 46b connected to the printed-circuit board 31 is connected to each charge amplifying IC 33 via the TAB film 32 and thus acts as a reference potential of the charge amplifying IC 33.

As described above, in the chest image recording and read-out apparatus 1, the high-voltage electric power source section 45 is located in the vicinity of the electrostatic recording section 10 and the printed-circuit board 31. Therefore, the length of the cable 46 for the connection of the electric power source is capable of being kept short. Also, a special cable need not be utilized as the cable 46. Accordingly, processing of the cable 46 becomes easy. Further, the hot side 46a of the cable 46 is connected directly by the bonding to the electrostatic recording section 10, and the grounding side 46b of the cable 46 is connected directly by the screw 47 to printed-circuit board 31. As a result, a special connector need not be utilized, and the cost of the chest image recording and read-out apparatus 1 is capable of being kept low.

Figure 7:
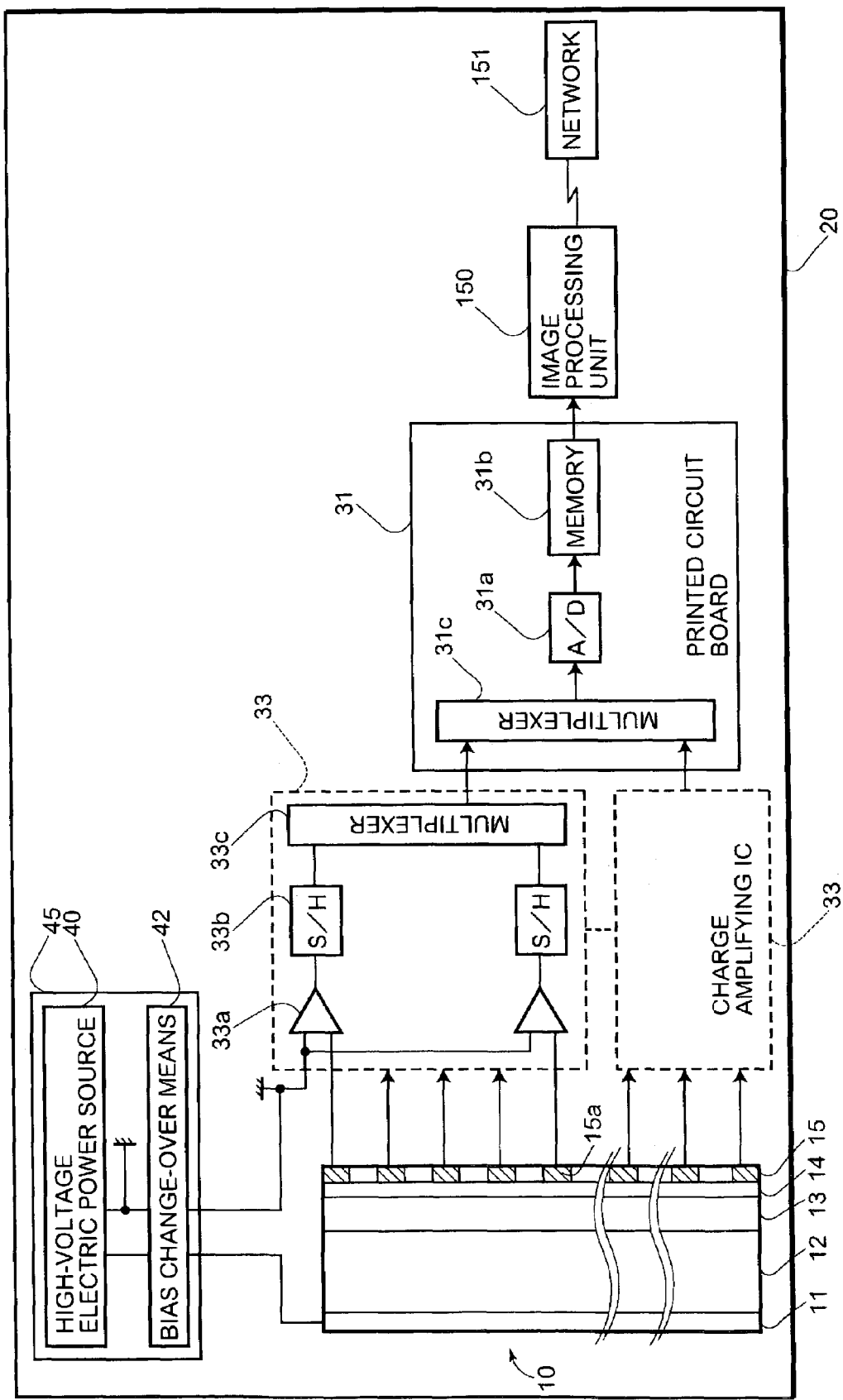
FIG. 7 is a block diagram showing how the current detecting means and the high-voltage electric power source section are connected to the solid-state detector.

FIG. 7 is a block diagram showing how the current detecting means 30 and the high-voltage electric power source section 45, which are located within the case housing 20, are connected to the solid-state detector 50.

As illustrated in FIG. 7, the high-voltage electric power source section 45 is constituted of a circuit, which comprises a high-voltage electric power source 40 and bias change-over means 42. The high-voltage electric power source 40 is connected to the electrostatic recording section 10 via the bias change-over means 42 for changing over between bias application to the electrostatic recording section 10 and short-circuiting. The circuit constituting the high-voltage electric power source section 45 is designed for prevention of charging and discharging excessive electric current, such that a peak value of the electric current flowing at the time of change-over may be limited and a portion of the apparatus, at which the electric current concentrates, may be prevented from being broken.

The charge amplifying IC 33 formed on the TAB film 32 comprises a plurality of charge amplifiers 33a, 33a, . . . , each of which is connected to one element 15a of the electrostatic recording section 10. The charge amplifying IC 33 also comprises a plurality of sampling and holding circuits (S/H) 33b, 33b, . . . , each of which is connected to one charge amplifier 33a. The charge amplifying IC 33 further comprises a multiplexer 33c for multiplexing signals obtained from the sampling and holding circuits 33b, 33b, . . . Each of the electric currents flowing out from the electrostatic recording section 10 is converted by each charge amplifier 33a into a voltage. The voltage is sampled and held by the corresponding sampling and holding circuit 33b at predetermined timings. The voltages, which have been sampled and held and which correspond to the respective elements 15a, 15a, . . . , are successively fed out from the multiplexer 33c, such that the voltages are changed over in the array order of the elements 15a, 15a, . . . (The successive feeding-out of the voltages from the multiplexer 33c corresponds to part of the main scanning operation.) The signals, which have been successively fed out from the multiplexer 33c, are fed into a multiplexer 31c, which has been formed on the printed-circuit board 31. Also, the voltages, which correspond to the respective elements 15a, 15a, . . . , are successively fed out from the multiplexer 31c, such that the voltages are changed over in the array order of the elements 15a, 15a, . . . The main scanning operation is finished with this step. The signals, which have been successively fed out from the multiplexer 31c, are converted by an analog-to-digital converter (A/D) 31a into a digital signal. The thus obtained digital signal is stored in a memory 31b.

As the pre-exposure light source of the pre-exposure light source section 60, it is necessary to utilize a light source having characteristics such that the pre-exposure light is emitted and quenched quickly and exhibits little afterglow. In this embodiment, an external electrode type of rare gas fluorescent lamp is utilized as the pre-exposure light source. Specifically, as illustrated in FIG. 1, the pre-exposure light source section 60 comprises a plurality of external electrode types of rare gas fluorescent lamps 61, 61, . . . , which extend in a direction normal to the plane of the sheet of FIG. 1. The pre-exposure light source section 60 also comprises a wavelength selecting filter 62, which is located between the rare gas fluorescent lamps 61, 61, . . . and the electrostatic recording section 10. The pre-exposure light source section 60 further comprises a reflecting plate 63 located on the side of the rare gas fluorescent lamps 61, 61, . . . , which side is opposite to the wavelength selecting filter 62. The reflecting plate 63 efficiently reflects the light, which has been radiated out from the rare gas fluorescent lamps 61, 61, . . . , toward the electrostatic recording section 10. It is sufficient for the pre-exposure light to be irradiated to the entire second electrically conductive layer 15 of the electrostatic recording section 10, and particular light converging means need not be provided. However, the pre-exposure light should preferably have a narrow illuminance distribution. As the pre-exposure light source, in lieu of the rare gas fluorescent lamps 61, 61, ..., for example, a surface-shaped light source comprising a plurality of LED chips arrayed in a surface form may be utilized. Also, in cases where the base plate 6 is imparted with the wavelength selecting properties, the wavelength selecting filter 62 may be omitted.

When the electrostatic latent image is to be read out from the electrostatic recording section 10, basically, the latent image charges having been accumulated in the electrostatic recording section 10 are capable of being read out perfectly. However, it will often occur that the electrostatic recording section 10 cannot be read out perfectly, and residual charges remain in the electrostatic recording section 10. Also, when the electrostatic latent image is to be recorded on the electrostatic recording section 10, a high voltage is applied across the electrostatic recording section 10 before the recording light is irradiated to the electrostatic recording section 10. When the high voltage is applied across the electrostatic recording section 10, dark current occurs, and electric charges (dark current charges) due to the dark current are accumulated in the electrostatic recording section 10. Further, it has been known that various kinds of electric charges other than the residual charges and the dark current charges are also accumulated in the electrostatic recording section 10 before the recording light is irradiated to the electrostatic recording section 10. The unnecessary charges, such as the residual charges and the dark current charges, which are accumulated in the electrostatic recording section 10 before the recording light is irradiated to the electrostatic recording section 10, are added to the electric charges, which are accumulated in the electrostatic recording section 10 when the recording light is irradiated to the electrostatic recording section 10 and which carry image information. As a result, when the electrostatic latent image is read out from the electrostatic recording section 10, besides the signal components in accordance with the electric charges carrying the image information, signal components due to the unnecessary charges are contained in the signals, which are obtained from the electrostatic recording section 10. In such cases, the problems with regard to a residual image phenomenon and decrease of the signal-to-noise ratio occur.

The pre-exposure operation is performed in order to erase the unnecessary charges, which are accumulated in the electrostatic recording section 10 before the recording light is irradiated to the electrostatic recording section 10, and to eliminate the problems with regard to a residual image phenomenon and decrease of the signal-to-noise ratio.

How the chest image recording and read-out apparatus 1 operates will be described hereinbelow.

Firstly, the imaging section 4 is moved vertically and located at a height appropriate for the size of the object (a patient).

Thereafter, the pre-exposure light is irradiated to the electrostatic recording section 10, and the unnecessary charges having been accumulated in the electrostatic recording section,10 are erased.

The pre-exposure operation may be performed before the voltage is applied across the electrostatic recording section 10. Alternatively, the pre-exposure operation may be performed after the voltage has been applied across the electrostatic recording section 10. Also, the pre-exposure light source may be turned on before the voltage is applied across the electrostatic recording section 10, and maybe turned off after the voltage has been applied across the electrostatic recording section 10.

When the electrostatic latent image is to be recorded on the electrostatic recording section 10, firstly, a negative pole of the high-voltage electric power source 40 is connected by the bias change-over means 42 to the first electrically conductive layer 11, and the d.c. voltage is applied across the first electrically conductive layer 11 and the elements 15a, 15a, .... In this manner, the first electrically conductive layer 11 and the second electrically conductive layer 15 are electrically charged. As a result, a U-shaped electric field having the concavity of the U-shape at the element 15a is formed between the first electrically conductive layer 11 and the element 15a in the electrostatic recording section 10.

Thereafter, the operator pushes an irradiation push button (not shown) with an appropriate timing. As a result, the grid 70 located on the side of the imaging section 4, which side stands facing the object, begins swinging. X-rays are irradiated to the electrostatic recording section 10 at the time at which the swinging speed of the grid 70 reaches a predetermined speed and a sufficient voltage has been applied across the electrostatic recording section 10 with the voltage application described above.

In the manner described above, the X-rays having passed through the object, i.e. the recording light carrying the radiation image information of the object, is irradiated to the electrostatic recording section 10. As a result, pairs of positive and negative charges occur in the recording photo-conductive layer 12 of the electrostatic recording section 10. Of the pairs of positive and negative charges, the negative charges are centralized upon the elements 15a, 15a, ... along the electric field distribution described above. In this manner, the negative charges are accumulated at the charge accumulating section 19, which is formed at the interface between the recording photo-conductive layer 12 and the charge transporting layer 13. The amount of the accumulated negative charges, i.e. the latent image polarity charges, is approximately in proportion to the dose of the radiation carrying the radiation image information. Therefore, the latent image polarity charges carry the electrostatic latent image. In this manner, the electrostatic latent image is recorded on the electrostatic recording section 10. The positive charges occurring in the recording photo-conductive layer 12 are attracted to the first electrically conductive layer 11, combine with negative charges injected from the high-voltage electric power source 40, and disappear.

After the X-rays are irradiated to the electrostatic recording section 10, and the electrostatic latent image has been recorded on the electrostatic recording section 10, the electrostatic latent image is read out from the electrostatic recording section 10. When the electrostatic latent image is read out from the electrostatic recording section 10, if the fans 26, 26 are being rotated, vibration of the TAB film 32, or the like, and a change in magnetic field will occur due to air flow, and there will be the risk that noise will occur in the detection signal. Therefore, at the time of the readout of the electrostatic latent image, the fans 26, 26 are ceased.

Firstly, the first electrically conductive layer 11 and the second electrically conductive layer 15 of the electrostatic recording section 10 are short-circuited by the bias change-over means 42. Thereafter, the reading exposure light source section 100 is operated, and the reading-light is radiated out from the light source 101. Also, the reading exposure light source section 100 is moved by the linear motor (not shown) and in the longitudinal direction of each element 15a, i.e. in the sub-scanning direction. In this manner, the entire area of the electrostatic recording section 10 is scanned with the reading light. As described above with respect to the reading exposure light source section 100, the line-like reading light, which has been radiated out from the reading exposure light source section 100, passes through the base plate 6 and the glass substrate 5 and is irradiated to each of the elements 15*a*, 15*a*, . . . of the electrostatic recording section 10.

As a result, pairs of positive and negative charges occur in the reading photo-conductive layer 14. Of the pairs of positive and negative charges, the positive charges move quickly through the charge transporting layer 13 so as to be attracted by the negative charges (the latent image polarity charges), which have been accumulated at the charge accumulating section 19. The positive charges combine with the latent image polarity charges at the charge accumulating section 19 and disappear. The negative charges occurring in the reading photo-conductive layer 14 combine with positive charges, which are injected into the second electrically conductive layer 15, and disappear. In this manner, the negative charges having been accumulated in the electrostatic recording section 10 disappear through the charge re-combination, and electric currents due to the movement of the electric charges at the time of the charge re-combination occur in the electrostatic recording section 10.

The electric currents are detected for the respective elements 15*a*, 15*a*, . . . in a parallel manner (simultaneously) by the charge amplifiers 33*a*, 33*a*, . . . for current detection, each of which is connected to one of the elements 15*a*, 15*a*, . . . Each of the signals, which have been detected by the charge amplifiers 33*a*, 33*a*, . . . , is sampled and held by the corresponding sampling and holding circuit 33*b*. The voltages, which have thus been sampled and held and which correspond to the respective elements 15*a*, 15*a*, . . . , are successively fed out from the multiplexer 33*c*, such that the voltages are changed over in the array order of the elements 15*a*, 15*a*, . . . The signals, which have been successively fed out from the multiplexer 33*c*, are fed into the multiplexer 31*c*, which has been formed on the printed-circuit board 31. Also, the voltages, which correspond to the respective elements 15*a*, 15*a*, . . . , are successively fed out from the multiplexer 31*c*, such that the voltages are changed over in the array order of the elements 15*a*, 15*a*, . . . The signals, which have been successively fed out from the multiplexer 31*c*, are converted by the analog-to-digital converter 31*a* into the digital signal. The thus obtained digital signal is stored in the memory 31*b*.

The electric currents, which flow through the electrostatic recording section 10 when the electrostatic recording section 10 is scanned with the reading light, occur in accordance with the latent image charges, i.e. the electrostatic latent image. Therefore, the image signal obtained by detecting the electric currents represents the electrostatic latent image. In this manner, the electrostatic latent image is capable of being read out.

The image signal, which has been stored in the memory 31*b*, is fed via the signal cable 90 into the external image processing unit 150. In the image processing unit 150, the image signal is subjected to appropriate image processing. The image signal, which has been obtained from the image processing, is up-loaded to a network 151 and fed into a server or a printer together with corresponding information, which gives specifics about the image recording operation.

Figure 8:
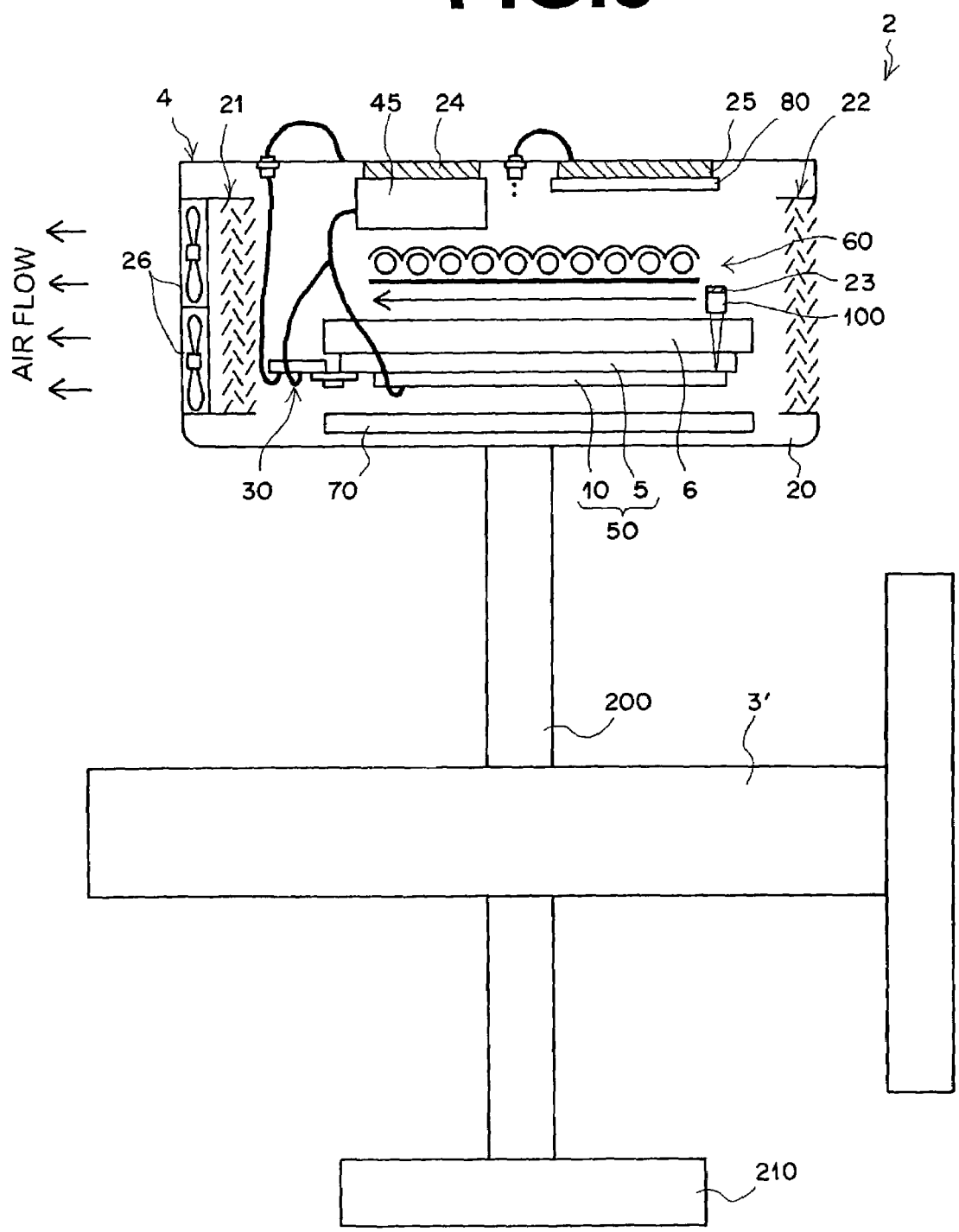
FIG. 8 is a side view showing a different embodiment of the imaging apparatus in accordance with the present invention, which is constituted as an X-ray image recording and read-out apparatus provided with an arm.

In the embodiment described above, the imaging apparatus in accordance with the present invention is constituted as the chest image recording and read-out apparatus 1. However, the imaging apparatus in accordance with the present invention is not limited to the chest image recording and read-out apparatus 1. For example, as illustrated in FIG. 8, the imaging apparatus in accordance with the present invention may be constituted as an X-ray image recording and read-out apparatus 2. The X-ray image recording and read-out apparatus 2 comprises a support post for image recording 3'. The X-ray image recording and read-out apparatus 2 also comprises an arm 200 acting as a moving section, which is supported by the support post for image recording 3' such that it is capable of being moved vertically, rotated, and tilted in oblique directions. The X-ray image recording and read-out apparatus 2 further comprises the imaging section 4 and an irradiating section 210, which are supported by the arm 200.

The imaging section 4 and the irradiating section 210, which are supported by the arm 200, are located so as to stand facing each other. The arm 200 is subjected to vertical movement, rotation, and the like, in accordance with a portion of the object, the image of which is to be recorded, an image recording angle, and the like. In this manner, the position of the imaging section 4 is adjusted, and the image recording operation is performed. The imaging section 4 of the X-ray image recording and read-out apparatus 2 is identical with the imaging section 4 of the chest image recording and read-out apparatus 1 described above. Also, the image recording operation is performed in the same manner as that in the imaging section 4 of the chest image recording and read-out apparatus 1 described above.

What is claimed is:

1. An imaging apparatus, comprising:
   i) a case housing,
   ii) a solid-state detector, which is accommodated within the case housing and is provided with a layer containing amorphous selenium as a principal constituent, the solid-state detector operating such that the solid-state detector records image information as an electrostatic latent image, and such that the solid-state detector generates electric currents in accordance with the electrostatic latent image when the solid-state detector is scanned with reading light, and
   iii) a heat discharging means for discharging heat within the case housing to the exterior of the case housing, such that a temperature of the layer containing the amorphous selenium as the principal constituent is kept at a temperature lower than 40° C.,
   wherein the heat discharging means comprises a fan, and
   wherein the fan is ceased at least at the time of detection of the electric currents.

2. An imaging apparatus as defined in claim 1 wherein the apparatus further comprises reading light irradiating means, which is accommodated within the case housing, and which irradiates the reading light to the solid-state detector, and
   the reading light irradiating means is provided with heat dissipation means.

3. An imaging apparatus as defined in claim 1 wherein the apparatus further comprises a reading light source, which is accommodated within the case housing, and which produces the reading light irradiated to the solid-state detector, and
   the reading light source is provided with a Peltier device and a heat sink, which is located on a heat emission side of the Peltier device.

4. An imaging apparatus as defined in claim 1 wherein the apparatus further comprises an electronic circuit board having predetermined functions, and accommodated within the case housing, and
   the electronic circuit board is provided with heat dissipation means.

5. An imaging apparatus as defined in claim 1 wherein the apparatus further comprises an electronic circuit board having predetermined functions, and accommodated within the case housing, and
   the electronic circuit board is provided with a heat transfer sheet for transferring heat to a wall of the case housing.

* * * * *